(12) United States Patent
Hayashi

(10) Patent No.: US 8,520,008 B2
(45) Date of Patent: Aug. 27, 2013

(54) PICTURE DISPLAY DEVICE

(75) Inventor: Takafumi Hayashi, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 615 days.

(21) Appl. No.: 12/419,544

(22) Filed: Apr. 7, 2009

(65) Prior Publication Data

US 2009/0256847 A1    Oct. 15, 2009

(30) Foreign Application Priority Data

Apr. 9, 2008   (JP) ................................. 2008-101894

(51) Int. Cl.
*G06T 11/00*   (2006.01)
*G09G 5/00*    (2006.01)

(52) U.S. Cl.
USPC ........... 345/472; 345/660; 345/661; 345/671; 345/670

(58) Field of Classification Search
None
See application file for complete search history.

(56) References Cited

U.S. PATENT DOCUMENTS

| | | | |
|---|---|---|---|
| 6,813,774 B2 * | 11/2004 | Inoue | 725/39 |
| 2002/0085123 A1 | 7/2002 | Ono | |
| 2005/0184968 A1 * | 8/2005 | Uchida et al. | 345/173 |
| 2008/0098429 A1 * | 4/2008 | Urabe et al. | 725/39 |
| 2009/0249429 A1 * | 10/2009 | Sullivan et al. | 725/133 |
| 2009/0256847 A1 * | 10/2009 | Hayashi | 345/472 |
| 2010/0141669 A1 | 6/2010 | Sadahiro | |
| 2011/0102680 A1 * | 5/2011 | Kobayashi | 348/625 |

FOREIGN PATENT DOCUMENTS

| | | |
|---|---|---|
| JP | 11-164201 A | 6/1999 |
| JP | 11-313265 A | 11/1999 |
| JP | 2000-310983 A | 11/2000 |
| JP | 2002-247474 A | 8/2002 |
| JP | 2002-296049 A | 10/2002 |
| JP | 2005-295338 A | 10/2005 |
| JP | 2006-93992 A | 4/2006 |
| JP | 2006-300983 A | 11/2006 |
| WO | 2007/034593 A1 | 3/2007 |

OTHER PUBLICATIONS

Japanese Office Action dated Aug. 21, 2012, issued in corresponding Japanese Patent Application No. 2008-101894.

* cited by examiner

*Primary Examiner* — Kee M Tung
*Assistant Examiner* — Leon T Cain, II
(74) *Attorney, Agent, or Firm* — Westerman, Hattori, Daniels & Adrian, LLP

(57) ABSTRACT

A picture display device including a display unit which displays a picture in accordance with a picture signal included in a broadcast signal. A display control unit displays a picture for an electronic program guide including characters on the display unit in accordance with program information included in the broadcast signal. A brightness information retriever retrieves information related to the brightness of the picture displayed on the display unit. The display control unit adjusts the size of the characters in the electronic program guide displayed on the display unit in accordance with the brightness information retrieved by the brightness information retriever.

9 Claims, 11 Drawing Sheets

PICTURE DISPLAY DEVICE

CROSS-REFERENCE TO RELATED APPLICATIONS

This application is based upon and claims the benefit of priority from prior Japanese Patent Application No. 2008-101894, filed on Apr. 9, 2008, the entire contents of which are incorporated herein by reference.

BACKGROUND ART

The present invention relates to a picture display device capable of displaying an electronic program guide on a display unit.

A typical television includes a display unit for displaying a picture in accordance with a picture signal, which is included in a broadcast signal. A television applicable for digital terrestrial television may display on the display unit an electronic program guide (EPG) in accordance with program information, which is included in a broadcast signal.

An electronic program guide is used to aid the selection of television programs and includes information for broadcast programs. For example, an electronic program guide includes information for programs broadcast by each broadcast station (channel) and shown in time frames. The picture for an electronic program guide includes characters representing various types of information for each program.

A technique for adjusting the size of the characters in an electronic program guide shown on a display unit is proposed. More specifically, a conventional program listing display device includes a display control unit for displaying an electronic program guide on a display means. The display control unit includes a generation means for generating an electronic program guide and a setting means for changing the size of the characters in the electronic program guide.

SUMMARY OF THE INVENTION

However, the conventional program display device has a shortcoming in that the viewer must manually operate the setting means to change the character size of the electronic program guide. Thus, unless the viewer adjusts the character size, the electronic program may be illegible.

It is an object of the present invention to provide a picture display device that automatically adjusts the size of characters in an electronic program guide so that the electronic program guide is legible to a viewer.

One aspect of the present invention is a picture display device which receives a broadcast signal including a picture signal. The picture display device includes a display unit which displays a picture in accordance with the picture signal included in the broadcast signal. A display control unit displays a picture for an electronic program guide including characters on the display unit in accordance with program information included in the broadcast signal. A brightness information retriever retrieves information related to the brightness of the picture displayed on the display unit. The display control unit adjusts the size of the characters in the electronic program guide displayed on the display unit in accordance with the brightness information retrieved by the brightness information retriever.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

[First Embodiment]

Figure 1:
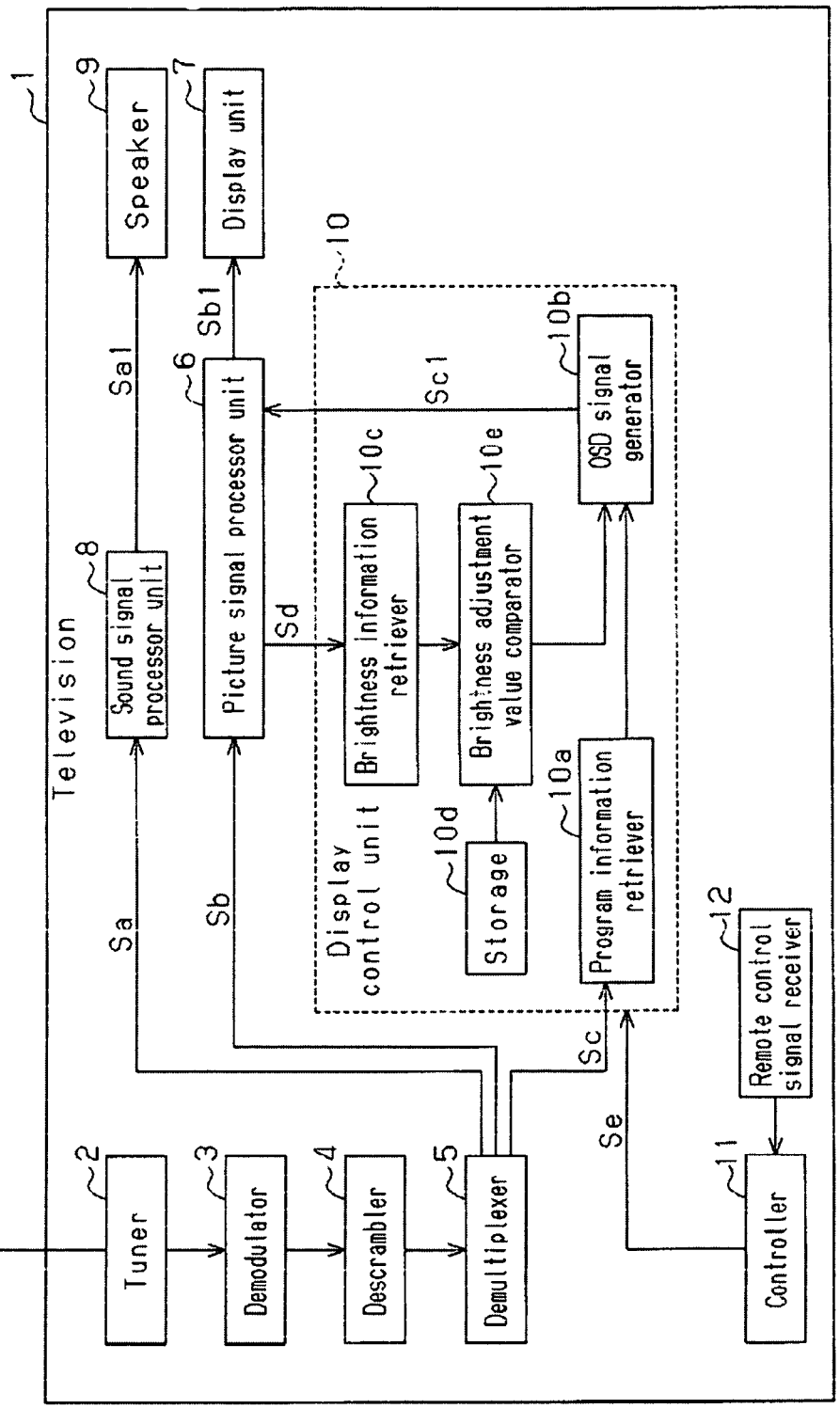
FIG. 1 is a block diagram of a picture display device according to a first embodiment of the present invention.

A picture display device according to a first embodiment of the present invention will now be discussed with reference to FIGS. 1 to 5. Referring to FIG. 1, a television 1, which serves as a picture display device, displays a picture on a display unit 7 in accordance with a picture signal Sb, which is included in a received broadcast signal SS. Further, the television 1 outputs sound from a speaker 9 in accordance with a sound signal Sa, which is included in the broadcast signal SS.

The television 1 includes a tuner 2, a demodulator 3, and a descrambler 4. The tuner 2 is connected to an antenna 1A, which receives the broadcast signal SS. The demodulator 3 demodulates signals provided from the tuner 2 and performs error code correction. The descrambler 4 descrambles signals demodulated by the demodulator 3. The broadcast signal SS is a digital broadcast signal.

A demultiplexer 5 separates the descrambled signal into a sound signal Sa, a picture signal Sb, program information Sc, and the like. A picture signal processor unit 6 processes the picture signal Sb. A sound signal processor unit 8 processes the sound signal Sa.

A display control unit 10 displays an electronic program guide (EPG) on the display unit 7 in accordance with the program information included in the broadcast signal SS.

In more detail, the display control unit 10 includes a program information retriever 10a, an OSD signal generator 10b, a brightness information retriever 10c, a storage 10d, and a brightness adjustment value comparator 10e. The program information retriever 10a retrieves the program information Sc. The OSD signal generator 10b performs on-screen display (OSD) processing to generate an OSD signal Sc1 for displaying an electronic program guide on the display unit 7. The display control unit 10 provides the picture signal processor unit 6 with the OSD signal Sc1 generated by the OSD signal generator 10b to display a picture for an electronic program guide on the display unit 7.

The television 1 includes the tuner 2, the picture signal processor unit 6, the sound signal processor unit 8, and a controller 11, which controls the display control unit 10 and the like. The controller 11 is a computation processor, which performs computations with a RAM (not shown) in accordance with a program stored in a ROM (not shown). The controller 11 is connected to a remote control signal receiver 12, which receives a remote control signal from a remote controller (not shown). The controller 11 generates various control signals in accordance with the received remote control signal and provides the control signals to the tuner 2, the picture signal processor unit 6, the sound signal processor unit 8, the display control unit 10, and the like. Among the various control signals, FIG. 1 shows only a control signal Se, which is for controlling the display control unit 10.

Figure 2:
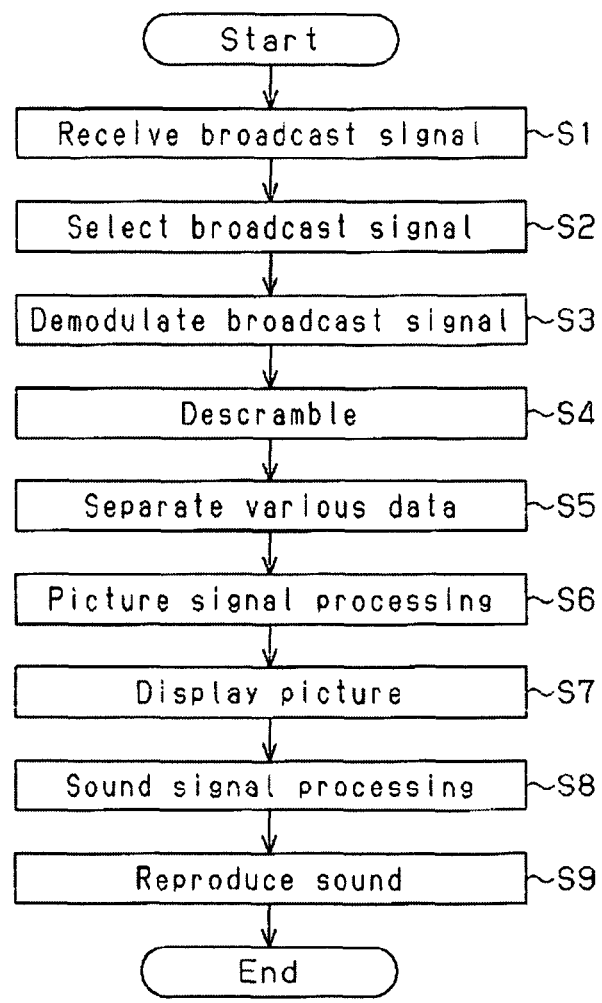
FIG. 2 is a flowchart illustrating the operation of a television shown in FIG. 1.

A picture and sound output operation performed by the television 1 will now be discussed with reference to FIG. 2. The television 1 receives broadcast signals SS, which are transmitted from a broadcast station or a communication satellite, separates picture signals Sb and sound signals Sa from the broadcast signals SS, and outputs the separated picture signals Sb and sound signals Sa respectively from the display unit 7 and the speaker 9.

The antenna 1A receives the broadcast signals SS and provides the received broadcast signals SS to the tuner 2 (step S1). The broadcast signals SS includes picture signals Sb and sound signals Sa. A sound signal Sa, a picture signal Sb, and data such as program information are multiplexed in a digital broadcast signal in compliance with MPEG-2 Systems.

Among the broadcast signals SS from the antenna 1A, the tuner 2 selects a broadcast signal SS, which has a specific frequency that corresponds to a channel (television channel) selected by the viewer. Then, the tuner 2 provides the selected broadcast signal SS to the demodulator 3 (step S2).

The demodulator 3 performs A/D conversion to demodulate the broadcast signal SS selected by the tuner 2 and performs error code correction to correct error codes generated during signal transmission. Then, the demodulator 3 provides the demodulated and error-corrected signal to the descrambler 4 (step S3).

When receiving a scrambled signal from the demodulator 3, the descrambler 4 uses a descramble key (release key) stored in an IC card (not shown) to descramble the scrambled signal and generates a transport stream (TS) format signal, which is unscrambled. The descrambler 4 then provides the TS format signal to the demultiplexer 5 (step S4).

The demultiplexer 5 separates a picture signal Sb, sound signal Sa, and program listing information (also referred to as service information) serving as program information from the TS format signal. The separated picture signal Sb is provided to the picture signal processor unit 6. The separated sound signal Sa is provided to the sound signal processor unit 8. The separated program information Sc is provided to the display control unit 10 (step S5).

The picture signal processor unit 6 performs various types of signal processing on the picture signal Sb (step S6). For example, when the picture signal Sb is compression-coded in accordance with MPEG-2 Video, the picture signal processor unit 6 decodes the picture signal Sb. When the picture signal processor unit 6 receives an OSD signal Sc1, the picture signal processor unit 6 performs OSD processing on the received OSD signal. The OSD process combines the OSD signal Sc1 and the picture signal Sb so that an image generated by the OSD signal Sc1 is displayed on the display unit 7 and given priority over an image generated by the picture signal Sb. For example, the picture signal processor unit 6, which receives the OSD signal Sc1 for displaying an electronic program guide, combines the OSD signal Sc1 with the picture signal Sb and generates a processed signal Sb1 to superimpose the electronic program guide on the image generated by the image signal Sb.

In step S6, the picture signal processor unit 6 performs signal processing on the picture signal Sb. Such signal processing includes scaling performed in accordance with the brightness adjustment of the picture or resolution of the display unit 7. The picture signal processor unit 6 uses a brightness adjustment value, which is stored in a memory (not shown) such as an EEPROM, to adjust the picture brightness. For example, if the brightness adjustment value is −10, the picture signal processor unit reduces the brightness of pixels forming the picture by 10%. If the brightness adjustment value is 20, the picture signal processor unit raises the brightness of pixels forming the picture by 20%. The brightness adjustment value may be set by a viewer with a remote controller or the like. In one embodiment, the brightness adjustment value may be variable within a range of −30 to 30.

The picture signal processor unit 6 provides the display unit 7 with the processed picture signal Sb1, which reflects the various types of processing. The display unit 7 displays a picture in accordance with the picture signal Sb1.

The sound signal processor unit 8 performs various types of signal processing on the sound signal Sa (step S8). For example, when the sound signal Sa is compression-coded in accordance with MPEG-2 AAC, the sound signal processor unit 8 decodes the sound signal Sa.

The sound signal processor unit 8 provides the speaker 9 with a processed sound signal Sa1, and the speaker 9 outputs sound in accordance with the sound signal Sa1 (step S9). Steps S6 and S7 are processed in parallel to steps S8 and S9.

The brightness information retriever 10c retrieves information related to the brightness of a picture shown in the display unit 7. The display control unit 10 adjusts the size of the characters in the electronic program guide displayed on the display unit 7 in accordance with the brightness information.

Figure 3:
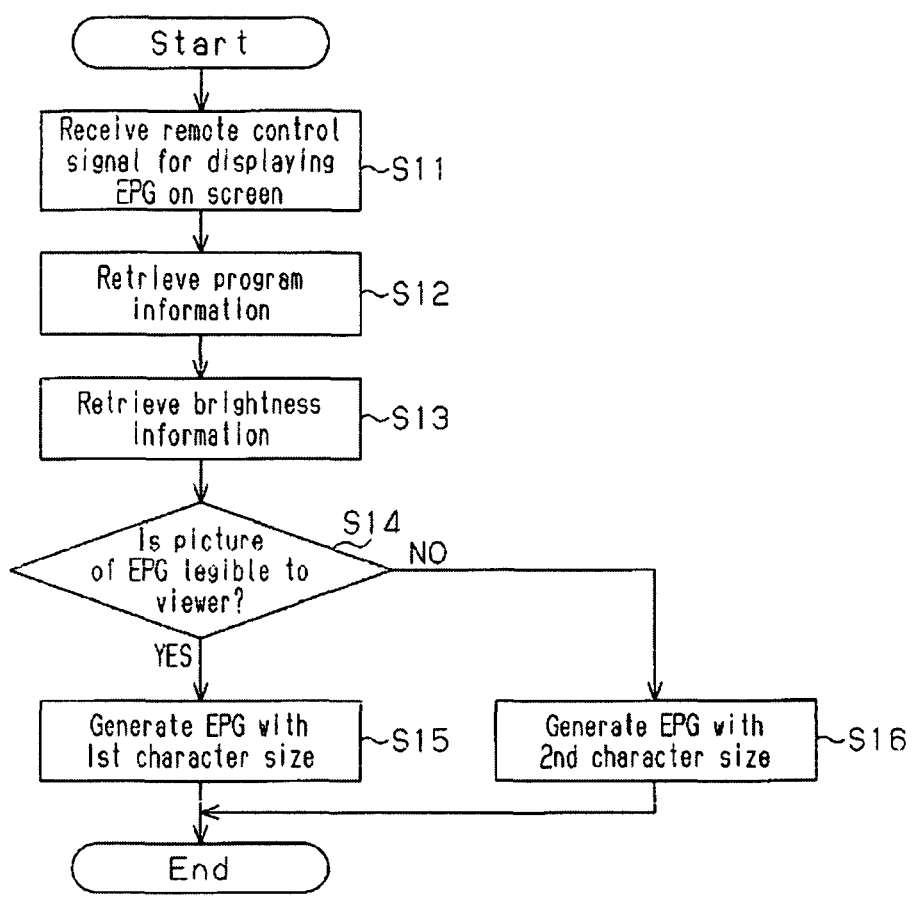
FIG. 3 is a flowchart illustrating a process for adjusting the size of the characters in an electronic program guide executed by a display control unit shown in FIG. 1.

A process for changing the character size that is executed by the display control unit 10 will now be discussed with reference to FIGS. 3 to 5.

In response to a remote control signal received by the remote control signal receiver 12 for displaying the electronic program guide on the display unit 7, the controller 11 provides the control signal Se to the display control unit 10 (step S11).

The display control unit 10 functions in response to the control signal Se. The program information retriever 10a retrieves program listing information, which is the program information Sc separated from a TS format signal by the demultiplexer 5, and provides the retrieved program information to the OSD signal generator 10b (step S12).

The program information retriever 10a may includes a memory (not shown) to store the program information separated from the TS format signal by the demultiplexer 5. This would shorten the time for retrieving the program information Sc.

Then, the brightness information retriever 10c retrieves information related to the brightness of the picture shown on the display unit 7 and provides the retrieved brightness information to the brightness adjustment value comparator 10e (step S13). For example, the information of the picture brightness is the brightness adjustment value Sd, which is used to adjust the brightness of a picture. The brightness information retriever 10c may retrieve the brightness adjustment value Sd used in step S6 from the picture signal processor unit 6.

Next, the brightness adjustment value comparator 10e compares the brightness adjustment value obtained in step S13 with a determination reference value stored in the storage 10d, which may be a memory. When the picture for an electronic program guide of which the brightness has been adjusted is displayed on the display unit 7, the brightness adjustment value comparator 10e determines whether or not the picture is legible to a viewer and provides the determination result to the OSD signal generator 10b (step 14). The determination reference value is used to determine whether a picture for the electronic program guide of which the brightness has been adjusted is legible to a viewer. Further, the determination reference value may be set beforehand in accordance with the results of sensory evaluation tests or the like. When the brightness adjustment value is less than the determination reference value (e.g., 0), the brightness adjustment value comparator 10e determines that the picture for the electronic program guide displayed on the display unit 7 is illegible to a viewer. When the brightness adjustment value is greater than or equal to the determination reference value, the brightness adjustment value comparator 10e determines that the picture for the electronic program guide displayed on the display unit 7 is legible to a viewer.

When it is determined that the picture for the electronic program guide displayed on the display unit 7 is legible to a viewer (YES in step S14), the OSD signal generator 10b generates the electronic program guide with a first character size and provides the picture signal processor unit 6 with the OSD signal Sc1 to display the generated electronic program guide on the display unit 7 (step S15). FIG. 4 shows a screen shot of the electronic program guide G1 generated with the first character size.

The electronic program guide G1 is a table including a channel listing section (e.g., "channel A"), time listing section (e.g., "PM 5"), and program listing section. The program listing section includes a plurality of program frames. Each program frame includes numbers such as 00 or 30, which indicates the time at which a program starts (e.g., PM 5:00 or PM 6:30). Each program frame may include a program title, program summary, cast, and other information related to the program. Hereinafter, the program title, program summary, cast, and other information related to the program are referred to as program description characters. The program description characters do not include the characters in the channel listing section (channel description characters), the characters in the time listing section, and the characters in the time listing section (time description characters). The starting time may also be referred to as program description characters.

When it is determined that the picture for the electronic program guide displayed on the display unit 7 is illegible to a viewer (NO in step S14), the OSD signal generator 10b generates the electronic program guide with a second character size and provides the picture signal processor unit 6 with the OSD signal Sc1 to display the generated electronic program guide on the display unit 7 (step S16). FIG. 5 shows a screen shot of the electronic program guide G2 generated with the second character size. Accordingly, the character size of the electronic program guide G2 generated in step S16 is larger than the character size of the electronic program guide G1 generated in step S15.

Figure 4:
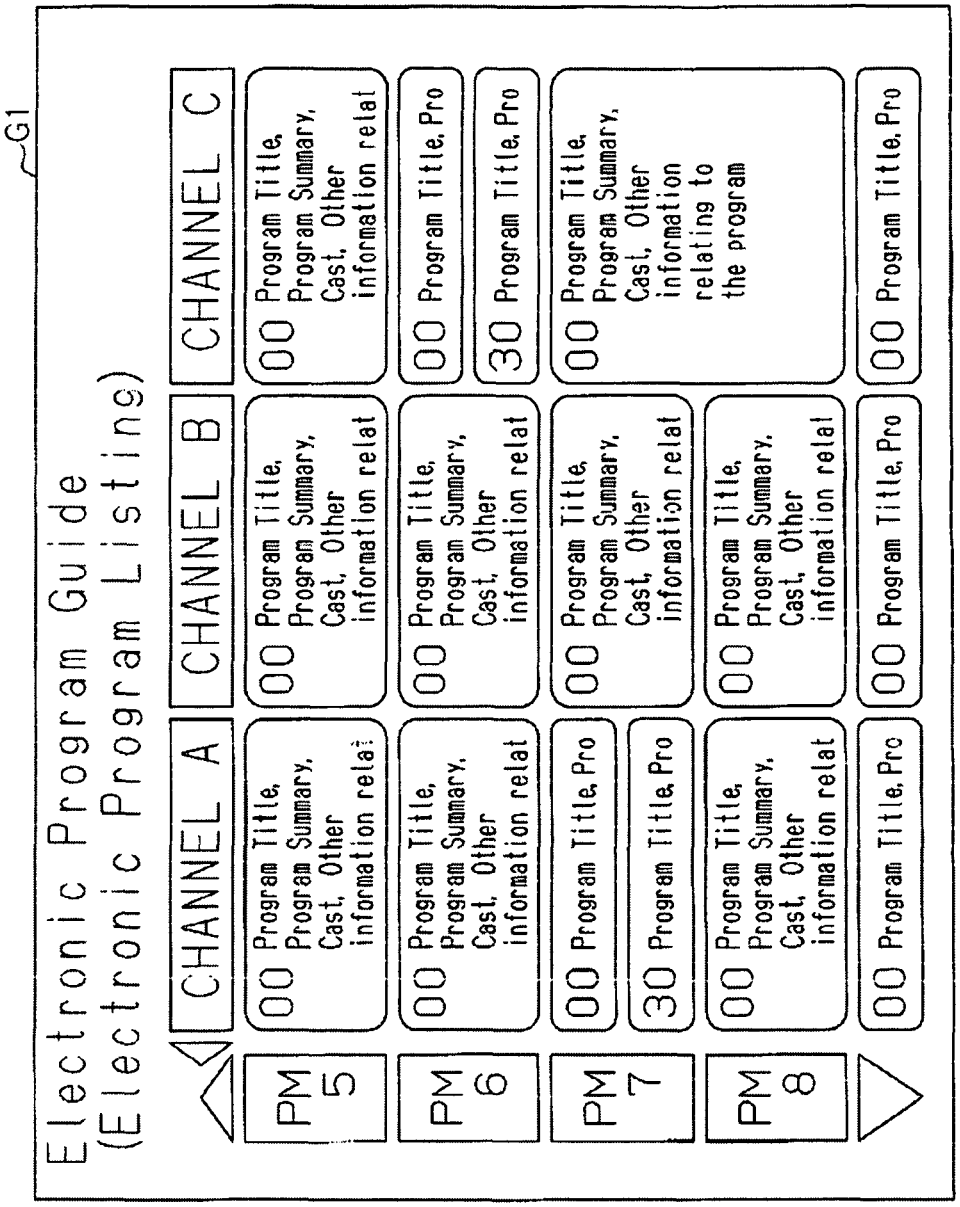
FIGS. 4 and 5 are screen shots of an electronic program guide.
Figure 5:
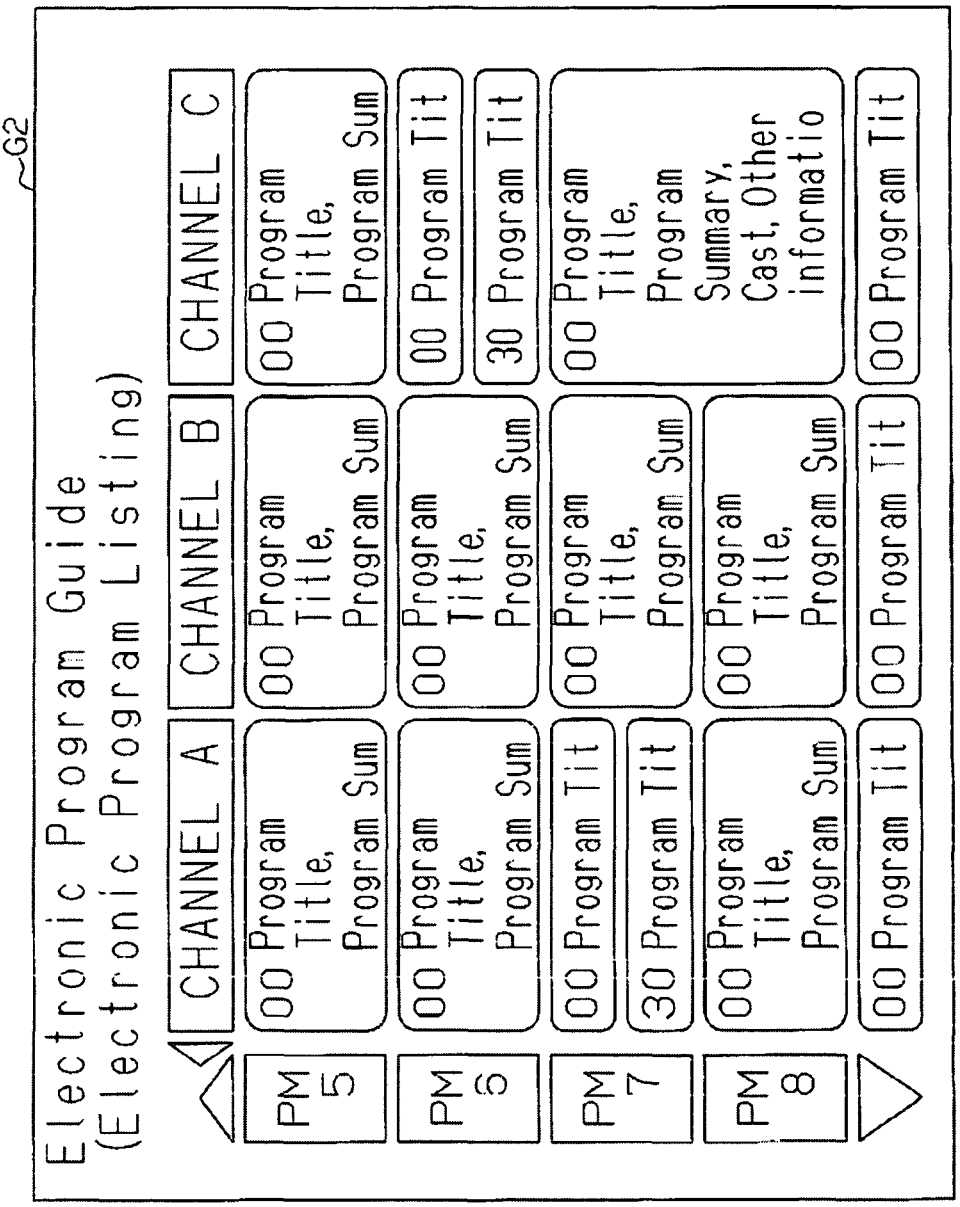

In the illustrated example, the size of the program description characters in each program frame is larger in FIG. 5 than in FIG. 4. However, the size of the channel description characters, the time description characters, and the starting time characters are the same in FIGS. 4 and 5. The size of the program listing section and the size of the program frames are also the same in FIGS. 4 and FIG. 5. The number of program frames in the electronic program guide G2 of FIG. 5 is the same as the number of program frames in the electronic program guide G1 of FIG. 4.

As described above, the size of the characters in an electronic program guide is adjusted by determining whether the picture for the electronic program guide of which the brightness has been adjusted is legible to a viewer and generating the electronic program guide with a different character size in accordance with the determination. The picture signal processor unit 6 performs signal processing to combine the OSD signal Sc1 from the display control unit 10 (more specifically, the OSD signal generator 10b of the display control unit 10) with the picture signal Sb. This shows an electronic program guide with an adjusted character size on the display unit 7.

The first embodiment has the advantages described below.

(1) The brightness information retriever 10c retrieves information related to the brightness of the picture shown on the display unit 7 (in the first embodiment, the brightness adjustment value Sd). In accordance with the brightness information retrieved by the brightness information retriever 10c, the display control unit 10 adjusts the size of the characters shown on the display unit 7. When the brightness of the picture shown on the display unit 7 is low, that is, when the brightness is such that the picture is illegible to a viewer, the viewer is provided with an electronic program guide of which character size has been adjusted in accordance with the brightness information. In this manner, the size of the characters included in an electronic program guide is automatically adjusted so that the electronic program guide is legible to a viewer. Thus, the viewer does not have to perform a manual operation when adjusting the character size.

(2) The display control unit 10 compares the brightness adjustment value, which is retrieved by the brightness information retriever 10c, with the determination reference value, which is stored in the storage 10d. This enables determination of whether or not the picture for an electronic program guide of which the brightness has been adjusted is legible to a viewer with a simple structure. When the brightness adjustment value is less than the determination reference value, the display control unit 10 enlarges the characters shown on the display unit 7 so that the character size becomes larger than when the brightness adjustment value is greater than or equal to the determination reference value. In this manner, when the brightness adjustment value is less than the determination reference value, the display control unit 10 automatically enlarges the size of the characters included in the electronic program guide to improve the visibility of characters and shows the electronic program guide in a form that is legible to a viewer.

[Second Embodiment]

A picture display device according to a second embodiment of the present invention will now be discussed with reference to FIGS. 6 and 7. To avoid redundancy, like or same reference characters are given to those components that are the same as the corresponding components of the first embodiment. Such components will not be described in detail.

Figure 6:
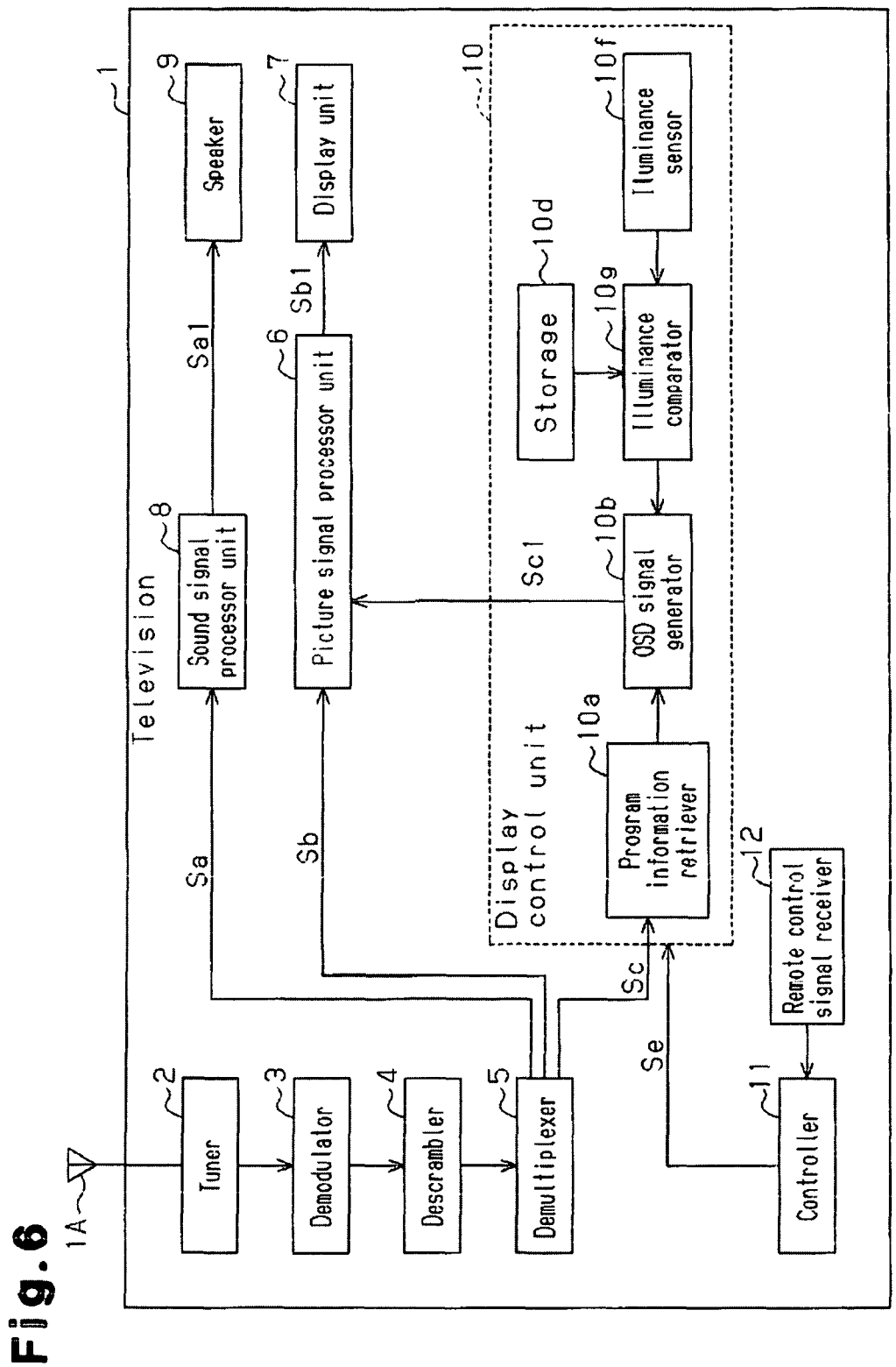
FIG. 6 is a block diagram of a picture display device according to a second embodiment of the present invention.
Figure 7:
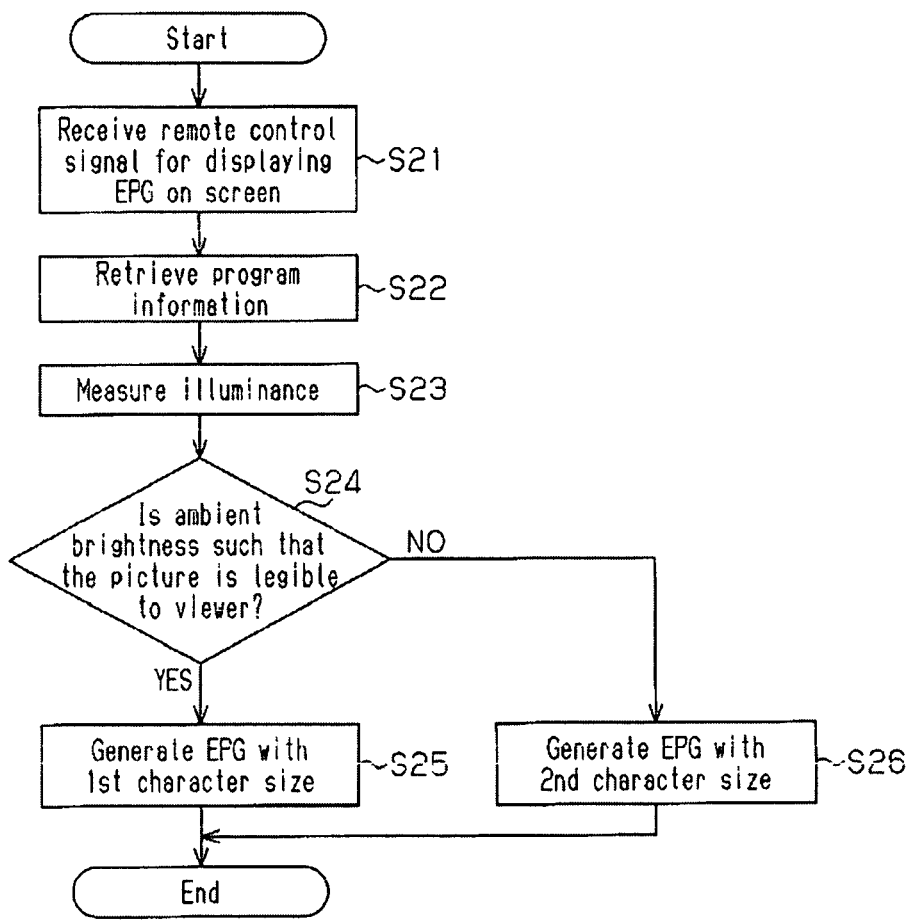
FIG. 7 is a flowchart illustrating a process for adjusting the size of the characters in an electronic program guide executed by a display control unit shown in FIG. 6.

FIG. 6 shows a television 1, which includes an illuminance sensor 10f in lieu of the brightness information retriever 10c shown in FIG. 1 and an illuminance comparator 10g in lieu of the brightness adjustment value comparator 10e. The display control unit 10 includes the program information retriever 10a, the OSD signal generator 10b, the illuminance sensor 10f, the storage 10d, and the illuminance comparator 10g.

The illuminance sensor 10f measures the ambient brightness of the display unit 7, for example, the brightness at the location of the display unit 7 and adjusts the character size of the electronic program guide displayed on the display unit 7 in accordance with the ambient brightness measured by the illuminance sensor 10f.

A process for changing the character size that is executed by the display control unit 10 will now be discussed with reference to FIG. 7.

In response to a remote control signal received by the remote control signal receiver 12 for displaying the electronic program guide on the display unit 7, the controller 11 provides the control signal Se to the display control unit 10 (step S21).

The display control unit 10 functions in response to the control signal Se. The program information retriever 10a retrieves program listing information, which is the program information Sc separated from a TS format signal by the demultiplexer 5, and provides the retrieved program information to the OSD signal generator 10b (step S22).

Then, the illuminance sensor 10f measures the ambient brightness of the display unit 7 and provides the measured ambient brightness to the illuminance comparator 10g (step S23). The illuminance measured by the illuminance sensor 10f is, for example, the illuminance at the location where the display unit 7 is set.

Next, the illuminance comparator 10g compares the illuminance measured in step S23 with a reference illuminance stored in the storage 10d, determines whether or not the picture for the electronic program guide displayed on the display unit 7 is legible to a viewer, and provides the determination result to the OSD signal generator 10b (step 24). The reference illuminance is used to determine whether a picture is legible to a viewer and set beforehand in accordance with the results of sensory evaluation tests or the like. When the measured illuminance is lower than the reference illuminance (e.g., 100 lux), it is determined that the surrounding of the display unit 7 is dark and the ambient brightness is such that the picture is illegible to a viewer. When the measured illuminance is higher than or equal to the reference illuminance (e.g., 100 lux), it is determined that the surrounding of the display unit 7 is bright and the ambient brightness is such that the picture is legible to a viewer.

When it is determined that the ambient brightness is such that the picture is legible to a viewer (YES in step S24), the OSD signal generator 10b generates the electronic program guide with a first character size and provides the picture signal processor unit 6 with the OSD signal Sc1 to display the generated electronic program guide on the display unit 7 (step S25). An electronic program guide generated with the first character size may be like that shown in FIG. 4 in the first embodiment.

When it is determined that the ambient brightness is such that the picture is illegible to a viewer (NO in step S24), the OSD signal generator 10b generates the electronic program guide with a second character size and provides the picture signal processor unit 6 with the OSD signal Sc1 to display the generated electronic program guide on the display unit 7 (step S26). An electronic program guide generated with the second character size may be like that shown in FIG. 5 in the first embodiment. Accordingly, the character size of the electronic program guide generated in step S26 is larger than the character size of the electronic program guide generated in step S25.

As described above, the size of the characters in an electronic program guide is adjusted by determining whether the ambient brightness is such that the picture is legible to a viewer and generating the electronic program guide with a different character size in accordance with the determination. The picture signal processor unit 6 performs signal processing to combine the OSD signal Sc1 from the display control unit 10 (more specifically, the OSD signal generator 10b of the display control unit 10) with the picture signal Sb. This shows an electronic program guide with an adjusted character size on the display unit 7.

(3) In accordance with the ambient brightness of the display unit 7 measured by the luminance sensor 10f, the display control unit 10 adjusts the size of the characters shown on the display unit 7. When it is determined that the surrounding of the display unit 7 is dark and the ambient brightness is such that the picture is illegible to a viewer, the viewer is provided with an electronic program guide of which character size has been adjusted in accordance with the measured ambient brightness. In this manner, the size of the characters included in an electronic program guide is automatically adjusted so that the electronic program guide is legible to a viewer. Thus, the viewer does not have to perform a manual operation when adjusting the character size.

(4) The display control unit 10 compares the illuminance measured by the illuminance sensor 10f with the reference illuminance stored in the storage 10d. This enables determination of whether or not the ambient brightness of the display unit 7 is such that the picture is legible to a viewer. When the illuminance, or ambient brightness of the display unit 7, is lower than the reference illuminance, the display control unit 10 enlarges the characters shown on the display unit 7 so that the character size becomes larger than when the ambient brightness is greater than or equal to the reference illuminance. In this manner, when illuminance, or ambient brightness of the display unit 7, is lower than the reference illuminance, the display control unit 10 automatically enlarges the size of the characters included in the electronic program guide to improve the visibility of characters and show the electronic program guide in a form that is legible to a viewer.

[Third Embodiment]

A picture display device according to a third embodiment of the present invention will now be discussed with reference to FIGS. 8 to 11. To avoid redundancy, like or same reference characters are given to those components that are the same as the corresponding components of the first embodiment. Such components will not be described in detail.

Figure 8:
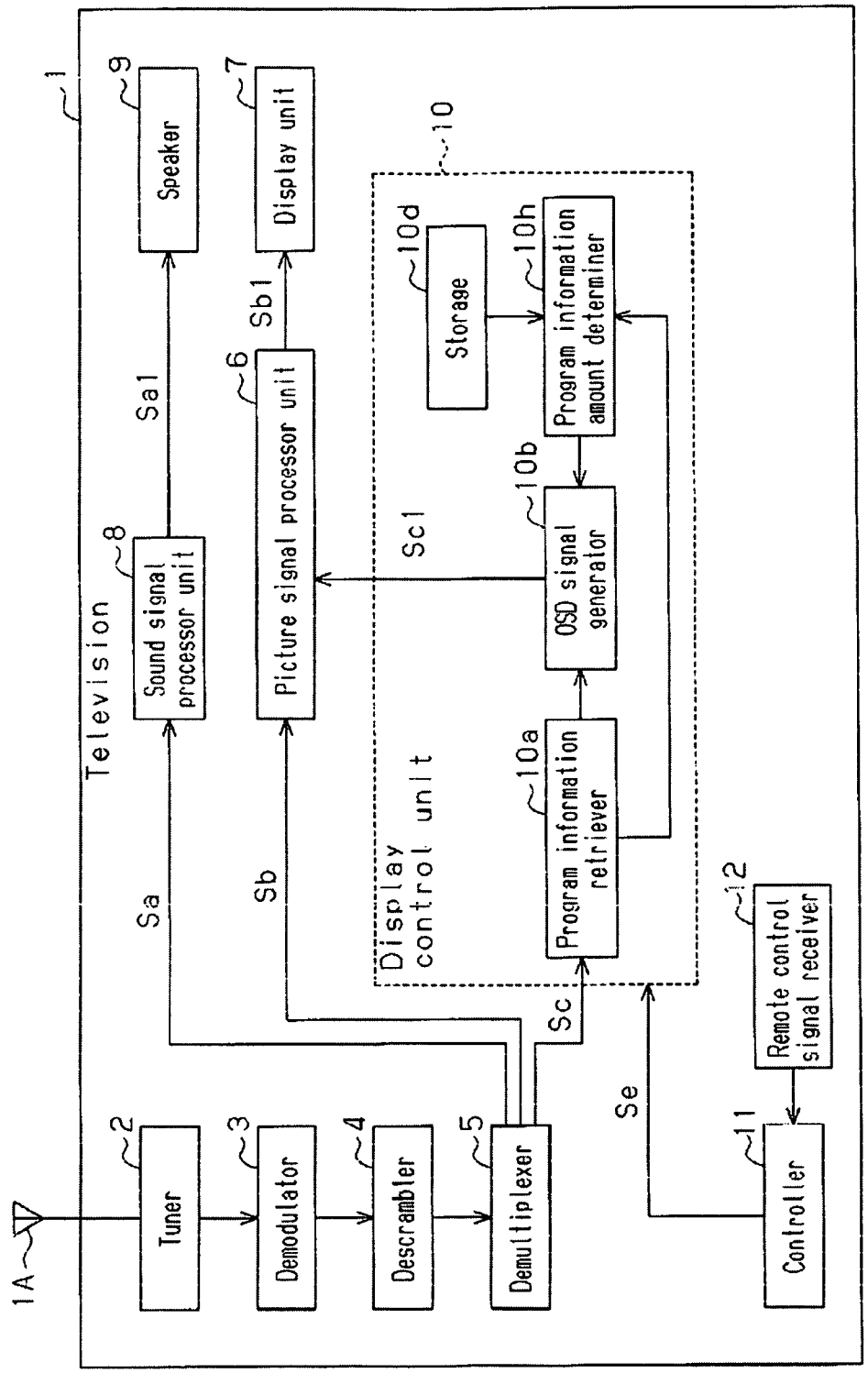
FIG. 8 is a block diagram of a picture display device according to a third embodiment of the present invention.
Figure 9:
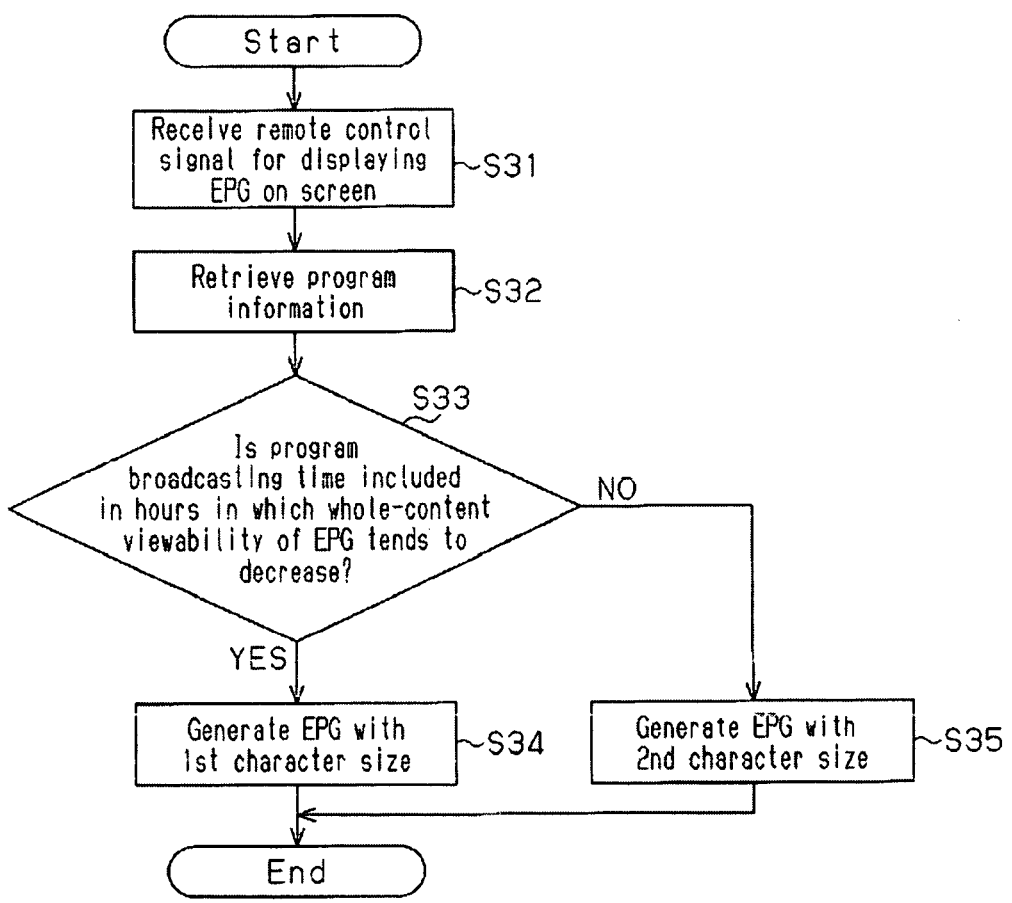
FIG. 9 is a flowchart illustrating a process for adjusting the size of the characters in an electronic program guide executed by a display control unit shown in FIG. 8.

FIG. 8 shows a television 1, the display control unit 10 of which includes the program information retriever 10a, the OSD signal generator 10b, the illuminance sensor 10f, the storage 10d, and a program information amount determiner 10h. The program information amount determiner 10h determines whether or not the broadcasting time of the broadcast programs shown in the electronic program guide is included in the hours in which the electronic program guide is shown in detail. That is, the program information amount determiner 10h determines whether or not the broadcast programs shown in the electronic program guide is included in the hours in which the whole-content viewability of the electronic program guide tends to decrease due to a large amount of information.

In accordance with the broadcasting time of the broadcast programs, the display control unit 10 adjusts the character size of the electronic program guide displayed on the display unit 7. A process for changing the character size that is executed by the display control unit 10 will now be discussed with reference to FIG. 9.

In response to a remote control signal received by the remote control signal receiver 12 for displaying the electronic program guide on the display unit 7, the controller 11 provides the control signal Se to the display control unit 10 (step S31).

The display control unit 10 functions in response to the control signal Se. The program information retriever 10a retrieves program listing information, which is the program information Sc separated from a TS format signal by the demultiplexer 5, and provides the retrieved program information to the OSD signal generator 10b (step S32). Further, the program information retriever 10a provides the program information amount determiner 10h with a program broadcast time Sf, which is included in the retrieved program information Sc.

Then, the program information amount determiner 10h determines whether or not the program broadcasting time Sf in the program information Sc is included in the hours in which the whole-content viewability of the electronic program guide tends to decrease. These hours are stored beforehand in the storage 10d. The program information amount determiner 10h provides its determination result to the OSD signal generator 10b (step S33). The hours during which the whole-content viewability of the electronic program guide tends to decrease refer to the hours in which the program information Sc includes a large amount of detailed descriptions for the program summary and the cast. For example, such hours refer to the hours of a day when the audience rating becomes the highest (the so-called prime time, from 19:00 to 23:00). During such hours, greater number of characters may be contained in the program information Sc compared to other hours (e.g., late night hours), and the whole-content viewability of the electronic program guide in such hours tends to decrease. In such hours, a considerable amount of information (characters) to be presented in a program frame may be unable to be displayed in the program frame in a manner that can be quickly understood by a viewer of the television 1, because of, for example, limitations of the area of the program frame.

Figure 10:
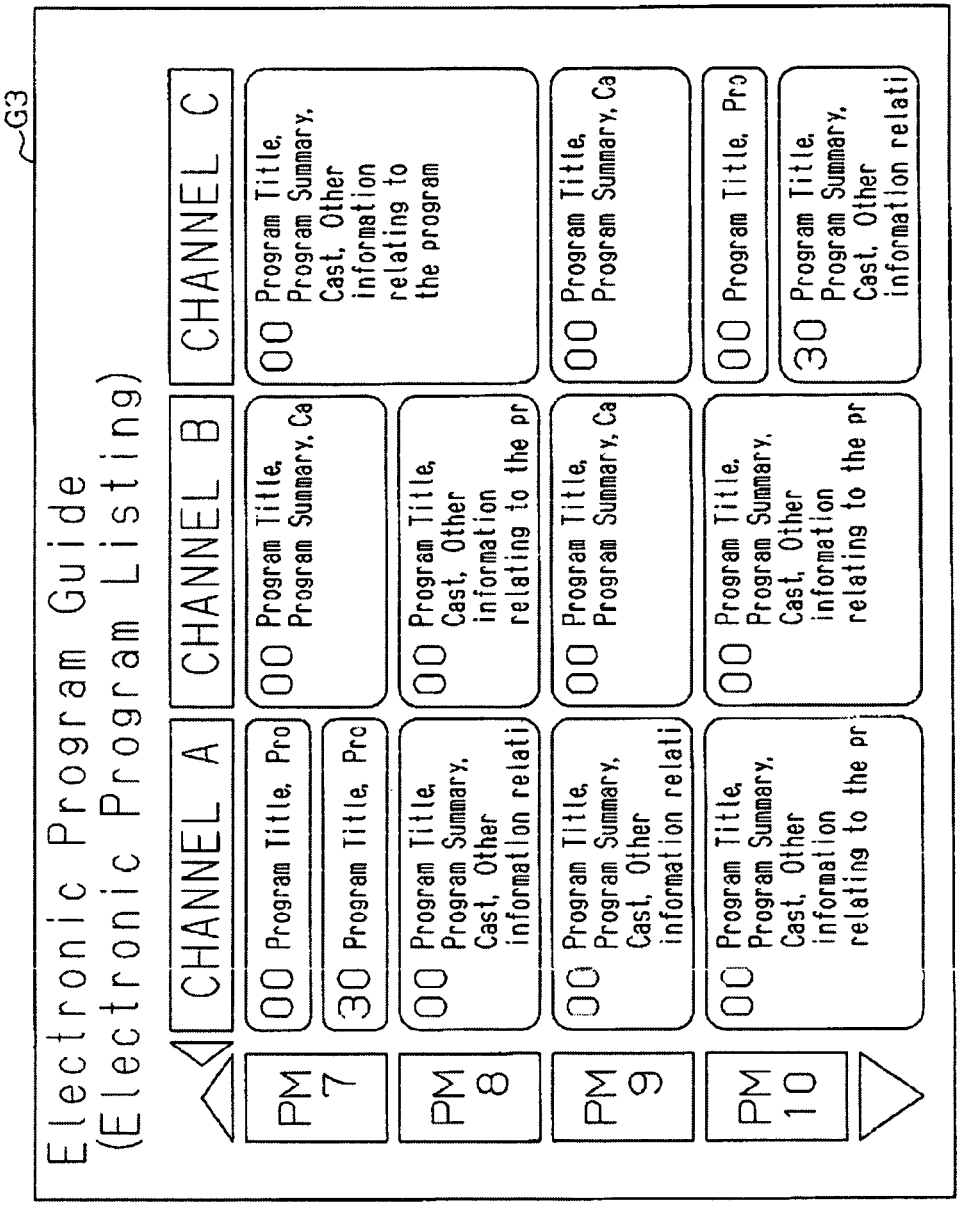
FIGS. 10 and 11 are screen shots of an electronic program guide.

When determined that the broadcasting time Sf is included in the hours in which the whole-content viewability of the electronic program guide tends to decrease (YES in step S33), the OSD signal generator 10b generates the electronic program guide with a first character size and provides the picture signal processor unit 6 with the OSD signal Sc1 to display the generated electronic program guide on the display unit 7 (step S34). FIG. 10 shows a screen shot of an electronic program guide G3 generated with the first character size.

Figure 11:
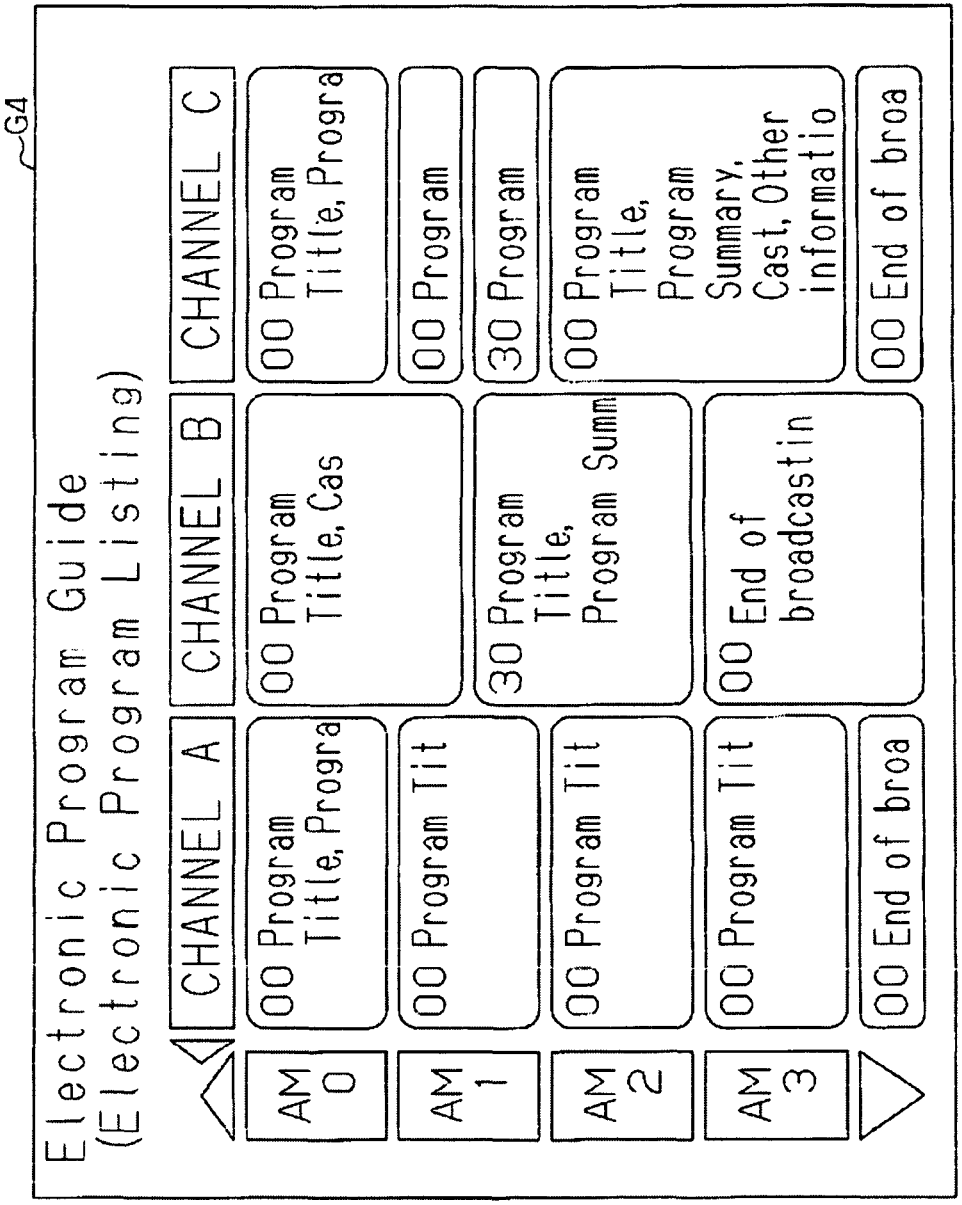

When determined that the broadcasting time Sf is excluded from the hours in which the whole-content viewability of the electronic program guide tends to decrease (NO in step S33), the OSD signal generator 10b generates the electronic program guide with a second character size and provides the picture signal processor unit 6 with the OSD signal Sc1 to display the generated electronic program guide on the display unit 7 (step S35). FIG. 11 shows a screen shot of an electronic program guide G4 generated with the second character size. The character size of the electronic program guide G3 generated in step S34 is smaller than the character size of the electronic program guide G4 generated in step S35.

In the example illustrated in FIG. 10, the size of the program description characters is smaller than that of FIG. 11. However, the size of the channel description characters, the time description characters, and the start time characters are the same in FIGS. 10 and 11.

As described above, the size of the characters in an electronic program guide is adjusted by determining whether or not the broadcasting hours of the programs in the electronic program guide are included in the predetermined hours and generating the electronic program guide with a different character size in accordance with the determination.

The third embodiment has the advantages described below.

(5) The display control unit 10 adjusts the size of the characters shown on the display unit 7 in accordance with the broadcasting hours of the broadcast programs. Even if the amount of program information included in an electronic program guide changes in accordance with the broadcasting time, the viewer is provided with an electronic program guide of which character size has been adjusted in accordance with the broadcasting time. In this manner, the size of the characters included in an electronic program guide is automatically adjusted so that the electronic program guide is legible to a viewer.

(2) When the program broadcasting time is included in the hours in which the whole-content viewability of the electronic program guide tends to decrease, the display control unit 10 reduces the size of the characters shown on the display unit 7. In this manner, when the program broadcasting time is included in the hours in which the whole-content viewability of the electronic program guide tends to decrease, the display control unit 10 automatically reduces the size of the characters included in the electronic program guide to improve the whole-content viewability and show the electronic program guide in a form that is legible to a viewer.

It should be apparent to those skilled in the art that the present invention may be embodied in many other specific forms without departing from the spirit or scope of the invention. Particularly, it should be understood that the present invention may be embodied in the following forms.

In the first embodiment, the brightness information retriever 10c may retrieve information other than the brightness adjustment value Sd as information related to the brightness. For example, the brightness information retriever 10c may retrieve the brightness of a picture of which the brightness has been adjusted. This would also obtain advantage (1).

In the second embodiment, any sensor that can measure the ambient brightness of the display unit 7 may be used in lieu of the illuminance sensor 10f. This would also obtain advantage (3).

In the third embodiment, when the broadcasting time of a program is included in the hours in which the whole-content viewability of the electronic program guide tends to decrease, the display control unit 10 reduces the size of the characters shown on the display unit 7 so that the character size becomes smaller than when the broadcasting time of a program is included in the hours in which the whole-content viewability of the electronic program guide increases. However, the present invention is not limited in such a manner. For example, when the broadcasting time of a program is included in the hours when the visibility of the electronic program guide should be improved, the display control unit 10 may enlarge the size of the characters so that the character size becomes larger than when the broadcasting time of a program is included in the hours when the visibility of the electronic program guide does not have to be improved. This would also obtain advantage (5).

In each of the above embodiments, the television 1 serves as the picture display device. However, any device may serve as the picture display device as long as it includes the display control unit 10 for showing the picture for an electronic program guide in accordance with the program information Sc included in the broadcast signals SS.

The first to third embodiments may be arbitrarily combined with one another.

The present examples and embodiments are to be considered as illustrative and not restrictive, and the invention is not to be limited to the details given herein, but may be modified within the scope and equivalence of the appended claims.

What is claimed is:

1. A picture display device which receives a broadcast signal including a picture signal, the picture display device comprising:
a display unit which displays a picture based on the picture signal included in the broadcast signal;
a display control unit which displays a picture for an electronic program guide including characters on the display unit based on program information included in the broadcast signal; and
a brightness information retriever which retrieves brightness information of the picture displayed on the display unit;
wherein the display control unit automatically decreases the size of the characters in the picture of the electronic program guide displayed on the display unit without changing the display area size of the picture of the electronic program guide on the display unit when the brightness information retrieved by the brightness information retriever indicates a relatively high brightness, and
wherein the display control unit automatically increases the size of the characters in the picture of the electronic program guide displayed on the display unit without changing the display area size of the picture of the electronic program guide on the display unit when the brightness information retrieved by the brightness information retriever indicates a relatively low brightness.

2. The picture display device according to claim 1, further comprising:
a picture signal processor unit which performs signal processing on the picture signal and adjusts the brightness of the picture with a brightness adjustment value; and
a storage which stores a determination reference value for determining whether or not the picture of which the brightness has been adjusted is legible to a viewer;
wherein the brightness information retriever retrieves the brightness adjustment value from the picture signal processor unit as the brightness information;
the display control unit compares the brightness adjustment value and the determination reference value to display the characters on the display unit with a first size when the brightness adjustment value is greater than or equal to the determination reference value and display the characters on the display unit with a second size, which is larger than the first size, when the brightness adjustment value is less than the determination reference value.

3. The picture display device according to claim 1, wherein:
the electronic program guide includes a channel listing section, a time listing section, and a program listing section, in which the program listing section includes a plurality of program frames; and
the display control unit adjusts the size of the characters in each program frame without changing the size of the characters in the channel listing section and the time listing section.

4. A picture display device which receives a broadcast signal including a picture signal, the picture display device comprising:
a display unit which displays a picture based on the picture signal included in the broadcast signal;
a display control unit which displays a picture for an electronic program guide including characters on the display unit based on program information included in the broadcast signal; and
a sensor which measures an ambient brightness of the display unit;
wherein the display control unit automatically decreases the size of the characters in the picture of the electronic program guide displayed on the display unit without changing the display area size of the picture of the electronic program guide on the display unit when the ambient brightness measured by the sensor is such that the picture of the electronic program guide is legible to a viewer, and
wherein the display control unit automatically increases the size of the characters in the picture of the electronic program guide displayed on the display unit without changing the display area size of the picture of the electronic program guide on the display unit when the ambient brightness measured by the sensor is such that the picture of the electronic program guide is illegible to a viewer.

5. The picture display device according to claim 4, further comprising:
a storage which stores a reference illuminance for determining whether or not the ambient brightness is such that the picture is legible to a viewer;
wherein the sensor is an illuminance sensor which measures illuminance at a location in which the display unit is set;
the display control unit compares the illuminance measured by the illuminance sensor and the reference illuminance stored in the storage to display the characters on the display unit with a first size when the illuminance is greater than or equal to the reference illuminance and display the characters on the display unit with a second size, which is larger than the first size, when the illuminance is less than the reference illuminance.

6. The picture display device according to claim 4, wherein:
the electronic program guide includes a channel listing section, a time listing section, and a program listing section, in which the program listing section includes a plurality of program frames; and
the display control unit adjusts the size of the characters in each program frame without changing the size of the characters in the channel listing section and the time listing section.

7. A picture display device which receives a broadcast signal including a picture signal, the picture display device comprising:
a display unit which displays a picture based on the picture signal included in the broadcast signal; and
a display control unit which displays a picture for an electronic program guide including characters on the display unit based on program information included in the broadcast signal;
wherein the display control unit automatically decreases the size of the characters in the picture of the electronic program guide displayed on the display unit without changing the display area size of the picture of the electronic program guide on the display unit when the broadcasting starting time of broadcast programs included in the picture of the electronic program guide is included in the hours in which whole-content viewability of the electronic program guide tends to decrease, and
wherein the display, control unit automatically increases the size of the characters in the picture of the electronic program guide displayed on the display unit without changing the display area size of the picture of the electronic program guide on the display unit when the broadcasting starting time of broadcast programs included in the picture of the electronic program guide is not included in the hours in which whole-content viewability of the electronic program guide tends to decrease.

8. The picture display device according to claim 7, further comprising:
a storage which stores the time in which whole-content viewability of the electronic program guide tends to decrease;
wherein the display control unit displays the characters on the display unit with a first size when the broadcasting starting time is excluded from the time in which the whole-content viewability of the electronic program guide tends to decrease and displays the characters on the display unit with a second size, which is smaller than the first size, when the broadcasting starting time is included in the time in which the whole-content viewability of the electronic program guide tends to decrease.

9. The picture display device according to claim 7, wherein:
the electronic program guide includes a channel listing section, a time listing section, and a program listing section, in which the program listing section includes a plurality of program frames; and
the display control unit adjusts the size of the characters in each program frame without changing the size of the characters in the channel listing section and the time listing section.

* * * * *